Aug. 6, 1940.   C. E. RUF   2,210,435
DIAL GAUGE
Filed June 17, 1939
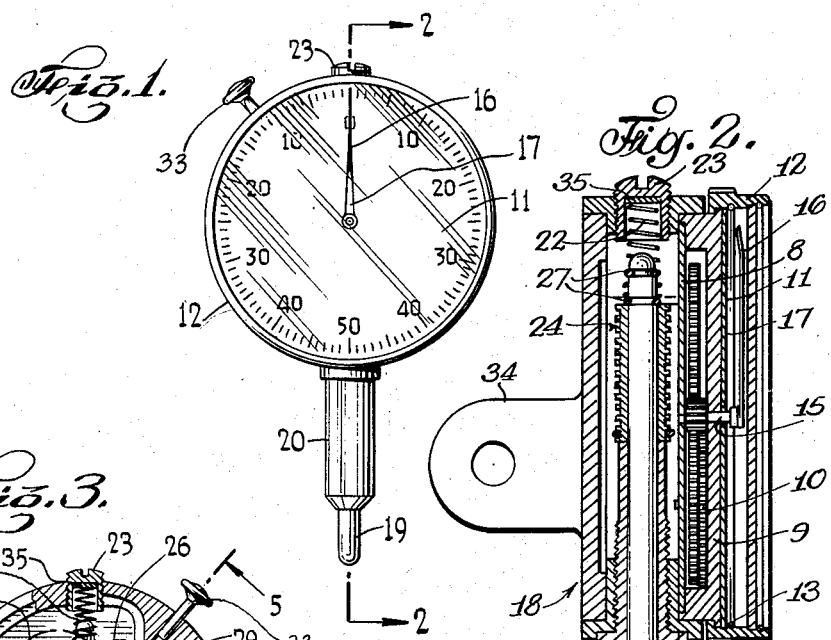
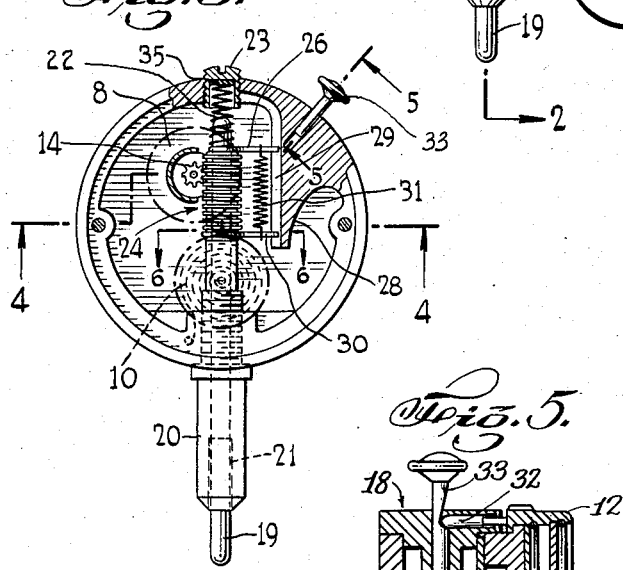
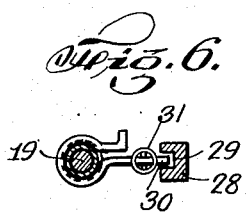
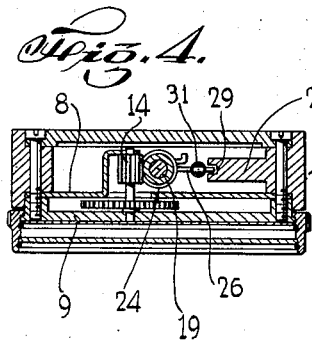
INVENTOR
Christian Eugene Ruf
BY Robert Calvert
ATTORNEY Patented Aug. 6, 1940

2,210,435

UNITED STATES PATENT OFFICE 2,210,435

DIAL GAUGE

Christian Eugene Ruf, Poughkeepsie, N. Y.

Application June 17, 1939, Serial No. 279,595

11 Claims. (Cl. 33—172)

This invention relates to a dial gauge and particularly to an improved device for gauging the thickness of sheets or parts such as those used in the assembly of an automobile or other machine.

Gauges conventionally used include a gauging plunger for contact with the article to be gauged, a dial, a dial pointer and gearing connecting the dial pointer with the gauging plunger.

It is an object of the invention to provide a gauge of simplified construction that is durable and resistant to breakage on being subjected to shock or being otherwise misused. Another object is to provide a gauge that may be quickly changed to a new setting and be easily adjusted to increase the range of the gauge. A further object is to provide a dial gauge that may be quickly assembled or disassembled and, therefore, quickly repaired. In more detail, an object of the invention is to provide a gauge that is proof against sudden blows on the plunger thereof and that, at the same time, has further increased useful life because of multiple settings of the sleeve rack, the sleeve rack of conventional gauges being usually the first part to wear out. Other objects and advantages of the invention will appear from the detailed description that follows.

In the preferred embodiment, the invention comprises a dial gauge including a sleeve rack disposed around the gauging plunger in movable relationship thereto, a dial pointer, and gearing connecting the pointer to the rack.

The invention will be illustrated by description in connection with the attached drawings, to which reference is made.

Fig. 1 is a front view of my improved gauge.

Fig. 2 is a vertical section on line 2—2 of Fig. 1.

Fig. 3 is a section on line 3—3 of Fig. 2.

Fig. 4 is a transverse section on line 4—4 of Fig. 3.

Fig. 5 is a section on line 5—5 of Fig. 3.

Fig. 6 is a section on line 6—6 of Fig. 3.

The dial gauge includes in combination a gear cover 8, base plate 9, hair spring gear 10, dial 11, bezel 12, and metal ring 13 constituting means for securing the dial within the bezel.

The base plate 9 has a shoulder on one side, to prevent the bezel 12, which also has a shoulder, from becoming disengaged on that side. The base plate is mounted secured on case 18, which mounting prevents bezel 12 from becoming disengaged on the other side of the base plate. The bezel is free to turn axially. With this construction no extra fastenings are needed.

Other parts of the gauge are the dial pointer rotatably, but securely mounted upon the pivot support 15 and preferably extending in one direction only from the support and being colored at its free end or point 16 in contrasting manner and over its body portion 17 in non-contrasting manner with respect to the color of the dial. Thus, for a dial that is white except for the graduations and numbering thereon, the free end of the dial pointer is suitably dull black and the body portion dull white.

The case of the dial gauge is indicated generally at 18.

The gauging plunger 19 extends through the bearing sleeve 20 and into the case, the bearing sleeve 20 at its outermost portion defining suitably an annular but small space 21 around the plunger and at its innermost part fitting snugly around the plunger but permitting, however, the free movement of the plunger within the bearing sleeve. The combination of the loose fitting and snug fitting portions of the bearing sleeve minimize the entrance of dust into the snugly fitting portion of the bearing sleeve. The fact that the plunger is rotatable on its axis, is of advantage; on such a rotatable plunger, the end is worn evenly, so as to give longer life to the measuring point.

Between the inner end of the gauging plunger and the case there is provided a buffer such as the coil spring 22 which is under compression. This spring contacts at its outer end with the stop 23 extending through a hole in the case 18. The hole being in line with the axis of the spring 22, and the screw 23 being removable, means are provided for convenient removal of the spring 22 and replacement by another or different spring when desired.

The screw 23 is somewhat longer than the thickness of wall of the case and is threaded therewithin. By turning the screw, the distance between its inner end and the inner end of the gauging plunger may be varied. In this manner the compression of the spring 22 may be varied.

There are shown in the drawings the rack 24 and gearing including pinion 14 and a conventional train of gears connecting the dial pointer to the rack. The gearing includes the hair spring gear 10, with a light tension, which keeps a pressure at all times on one side of the teeth of the gears to avoid backlash.

The rack, on the other hand, is a toothed sleeve disposed around the gauging plunger. The sleeve is movable axially, that is, lengthwise with respect to the plunger, as well as radially. A stop 26 on the gauging plunger limits the axial movement of the rack. This stop consists, suitably, of a member secured to the plunger as in any one of a series of grooves 27, providing means for variable setting of the stop 26. At one end this stop is kept in desired alignment by the part 28 provided with slot 29 extending approximately parallel to the axis of the gauging plunger.

The outer surface of the sleeve is provided with accurately spaced non-communicating straight grooves or with threaded grooves. When the grooves are non-communicating, they lie in planes perpendicular to the axis of the plunger, as illustrated.

The stop 26 on the gauging plunger is connected by a coil spring to a member 30 which fits around the end of the rack which is remote from the said stop. This member is suitably of a spring metal which normally fits tightly around the circumference of the rack. Being connected by the tension spring 31 to the said stop and the end of member 30 extending movably into the slot 29, the said member is kept in alignment with the stop. Also, a leg of part 30 extends into the said slot 29. However, the spring engagement of the member 30 around the rack may be loosened, as by spreading apart the two ends of the spring, so as to permit setting of any point of the rack in desired radial relationship to the gauging plunger or gearing. This radial adjustability of the rack with respect to the plunger and gearing makes possible the convenient setting of the rack, so that a new part may be subjected to the action of the gearing when a given line or zone extending longitudinally of the rack has become worn by long use. At the same time, the friction fit of part 26, pressed against the plunger by spring action of the metal of the said part and guided (prevented from rotating) by the spring 31 attached at one end to part 30 which moves in slot 29, as referred to above, makes the plunger rotatable only under a substantial torque. This prevents accidental rotation of the plunger during the taking of measurements, while permitting axial setting of the plunger.

A feature of the invention resides in the functioning of the rack with respect to the plunger. When the gauge is used normally, the lifting of the plunger by the article to be gauged produces through the hair spring gear 10 and the spring 31 a corresponding lifting of the rack; this movement is registered through the gearing on the dial pointer. If, however, the gauging plunger is submitted to a sudden shock causing a violent upward thrust, then the inertia of the sleeve rack and parts geared thereto causes the sleeve to move upward less abruptly, without the sudden undesirable thrust to which the plunger is subjected; the spring gear and coil spring 31 promptly but smoothly pull the rack upward against the stop 26. The spring establishes and maintains the rack at the measuring position therefor, against this stop, in fixed relationship to the gauging plunger. The rack in no case will move upwardly under a force greater than that supplied by the tension of the hair spring and the spring 31, except for some friction on the plunger.

It is noted, also, that the spring 31 acts directly on the rack. For this reason, the spring places no continuous strain on any part of the gearing of the gauge. For some purposes, however, the coil spring may be omitted. In that case, the hair spring alone must maintain the sleeve at the measuring position against the stop 26.

Special means are provided for setting the bezel and the dial held therein. These means include the pin 32, extending movably through a portion at least of the case and against an edge of the bezel, and a wedge member 33 extending also through part of the case. The wedge is movable transversely with respect to said pin and against the rear end thereof. On moving the wedge in the appropriate direction, the pin is released so that its frictional engagement with the edge of the bezel is loosened. The bezel is then turned to the desired position for setting. The wedge is then forced against the rear of the pin, so that the pin is thrust against the bezel, so as to make secure the desired setting of the bezel and dial held therewithin.

The range of the dial gauge itself may be varied by moving the stop 26 towards or away from the upper end of the rack 24. Also, the range may be increased by rotation of the back of the case, the back of the case being provided with an eccentrically mounted lug 34 or extension. The lug is designed for attachment to a conventional support (not shown) to hold the gauge when in use above a working table or bench. By turning the back with its eccentric extension, say 180°, the dial gauge may be raised or lowered away from the working table or bench. The back is held in the case and set with respect thereto suitably by screws of usual type extending through the back and into holes in the main part of the case.

As a further means of minimizing the shock to which the gauge may be subjected, when the gauging plunger is suddenly thrust upward, the stop 23 may be provided with a cushion 35, say of a common non-tacky, resilient gasketing material, such as one including rubber, rubber and asbestos, or leather. This cushion may be held within the end of the screw 23 which, for the purpose, is hollowed out somewhat at its inner end.

The facts that the rack may be rotated around the plunger, to expose a new and unused zone to engagement by the pinion, and that violent blows against the gauging plunger may be absorbed, without injuring the delicate gearing, have been mentioned.

A gauge of the kind described has a number of important advantages in addition to those indicated above.

The gauge has a relatively small number of parts as compared to usual gauges for the same type of use. It is simple in construction, easy to assemble, and disassemble, and resistant to wear and breakage.

Compression on the stop spring 22 may be adjusted without taking the instrument apart, by simply turning the screw 23 in the proper direction.

The bezel may be released for rotating or locked in position quickly and conveniently, by means of the wedge and pin described.

Finally, the hand, which extends in only one direction from the point of support 15 and is colored as described, tends to focus the attention of the user of the gauge upon that part of the hand or dial pointer the position of which is to be read.

It will be understood that the details given are for the purpose of illustration, not restriction, and that variations within the spirit of the invention are intended to be included within the scope of the appended claims. It will be understood, also, that certain elements of my dial gauge may be omitted if their function is not desired in a gauge for a particular purpose.

I claim:

1. A dial gauge comprising in combination a dial, a dial pointer movable over the dial, a rack, gearing connecting the dial pointer to the rack, a gauging plunger of circular cross section, and means for establishing the rack at the measuring position in a fixed relation to the gauging plunger, the rack consisting of a toothed cylindrical sleeve fitting movably around the gauging plunger so that the plunger is rotatable and movable longitudinally within the rack.

2. A dial gauge comprising in combination a dial, a dial pointer movable over the dial, a gauging plunger, a sleeve rack disposed around the plunger, means for establishing the sleeve rack in measuring position in a fixed relation to the plunger, and gearing connecting the dial pointer to the sleeve rack, the said means including a stop on the plunger at a position above the upper end of the sleeve, a rotation preventing element fitting around the lower end of the sleeve, and a stretched spring acting upon the said stop and element and tending to draw the element towards the stop.

3. A dial gauge comprising in combination a case, a circular bezel rotatable with respect to the case, a dial, means securing the dial within the bezel, a pin extending in axially movable manner through a portion of the case and against an edge of the bezel, and a wedge member extending within the case and extending on its sloping face against the rear end of the pin, the wedge member being movable transversely to the axis of the pin, so as to tighten or loosen the contact of the pin with the bezel and fix or make rotatable the bezel.

4. A dial gauge comprising a gauging plunger of circular cross section, a cylindrical rack sleeve fitting therearound, a dial pointer, gearing connecting the dial pointer with the rack, a stop for the sleeve secured to the said plunger, a spring urging the sleeve against the said stop, and means on the plunger for variable setting of the said stop, the plunger being rotatable and movable longitudinally within the rack.

5. A dial gauge comprising a case, a gauging plunger, a dial pointer, a rack activated by the gauging plunger, gearing connecting the dial pointer to the rack, a stop on the plunger for the rack, means for setting the rack radially with respect to the plunger, a compression spring disposed between the inner end of the plunger and the said case, means for holding the spring in position and adjusting the compression of the spring, a bearing sleeve fitting snugly around the plunger at the innermost part of the housing, a support for the gauge, and an extension on the back of the case for attachment to the support, the said extension being eccentrically located and the said back being rotatable within the case, so that the elevation of the gauge with respect to the support may be varied.

6. A dial gauge comprising a case, a gauging plunger, and a bearing sleeve extending around the plunger and to the case, the plunger being rotatable within the sleeve and the gauge including means for setting the plunger at various axial positions while preserving unchanged the longitudinal relationship of the plunger with respect to the bearing sleeve.

7. A dial gauge comprising in combination a dial, a dial pointer movable over the dial, a gauging plunger, a rack consisting of an exteriorly toothed sleeve fitting around the gauging plunger, so that the plunger is movable longitudinally and axially within the rack, gearing connecting the dial pointer to the rack, means for establishing the rack at the measuring position in a fixed relation to the gauging plunger, and means for setting the rack radially with respect to the said gearing, the said setting means including a guide part provided with a slot extending approximately parallel to the axis of the gauging plunger, an element secured to the gauging plunger and extending into the said slot in movable relationship therewithin, a member secured around the circumference of the said rack and adapted to be loosened in its fitting around the said circumference, so that the rack may be secured at various radial settings within the said member, and an aligning part connecting the said element and member.

8. A dial gauge comprising in combination a dial, a dial pointer movable over the dial, a rack, gearing connecting the dial pointer to the rack, a gauging plunger, and means for establishing the rack at the measuring position in a fixed relation to the gauging plunger, the rack consisting of a toothed sleeve fitting around the gauging plunger so that the plunger is movable longitudinally and axially within the rack, and the rack being provided with spaced grooves extending completely around the circumference of the sleeve and the rack being axially rotatable with respect to the said gearing.

9. A dial gauge comprising in combination a dial, a dial pointer movable over the dial, a rack, gearing connecting the dial pointer to the rack, a gauging plunger, and means for establishing the rack at the measuring position in a fixed relation to the gauging plunger, the rack consisting of a toothed sleeve fitting around the gauging plunger so that the plunger is movable longitudinally and axially within the rack and the rack being provided with spaced grooves extending completely around the circumference of the sleeve, the rack being axially rotatable with respect to the said gearing, the gauge including means for securing at various positions the axial setting of the rack with respect to the gearing, and the said means for establishing the rack at the measuring position with respect to the plunger including a spring forcing the rack to the said position.

10. A dial gauge comprising in combination a dial, a dial pointer movable over the dial, a rack, gearing connecting the dial pointer to the rack, a gauging plunger, and means for establishing the rack at the measuring position in a fixed relation to the gauging plunger, the rack consisting of a toothed sleeve fitting around the gauging plunger so that the plunger is movable longitudinally and axially within the rack and the rack being provided with spaced grooves extending completely around the circumference of the sleeve, being non-communicating with each other, and lying each in a plane extending at a right angle to the axis of the plunger, the rack being axially rotatable with respect to the said gearing, and the gauge including means for securing at various positions the axial setting of the rack with respect to the gearing.

11. A dial gauge comprising a case, a gauging plunger, and a bearing sleeve extending around the plunger and to the case, the plunger being rotatable within the sleeve, the gauge including means for setting the plunger at various axial positions, the means for setting the plunger axially including a member frictionally engaging the plunger and pressed thereagainst by spring action, and the gauge including means for preventing rotational movement of the said member, so as to make the plunger rotatable only under substantial torque.

CHRISTIAN EUGENE RUF.